United States Patent [19]
Vandagriff

[11] Patent Number: 5,445,427
[45] Date of Patent: Aug. 29, 1995

[54] PIVOTABLE SUN VISOR ATTACHMENT

[76] Inventor: Craig A. Vandagriff, 25637 Gardenstone La., West Hills, Calif. 91307

[21] Appl. No.: 162,856

[22] Filed: Dec. 6, 1993

[51] Int. Cl.$^6$ ............................................. B60J 3/02
[52] U.S. Cl. ............................... 296/97.6; 296/97.8; 296/97.12; 296/97.11
[58] Field of Search ............ 296/97.6, 97.7, 97.8, 296/97.9, 97.11, 97.12, 97.13

[56] References Cited

U.S. PATENT DOCUMENTS

| | | | |
|---|---|---|---|
| 2,153,095 | 4/1939 | McKinley | 296/97.11 |
| 2,517,872 | 8/1950 | Hamel | 296/97 |
| 2,596,873 | 5/1952 | Solmes | 296/97.8 |
| 3,201,170 | 8/1965 | Weingarten | 296/97 |
| 3,617,088 | 11/1971 | Graham | 296/97 C |
| 3,679,255 | 7/1972 | Nacarato | 296/97 C |
| 3,722,949 | 3/1973 | Palman | 296/97 C |
| 3,825,296 | 7/1974 | Peterson | 296/97 D |
| 4,792,176 | 12/1988 | Karford | 296/97.8 |
| 4,810,023 | 3/1989 | Kawada | 296/97.8 |
| 4,858,982 | 8/1989 | Dykmstra et al. | 296/97.5 |
| 4,913,483 | 4/1990 | Jasso | 296/97.6 |
| 4,950,021 | 8/1990 | Vandagriff | 296/97.11 X |
| 5,156,434 | 10/1992 | Vandagriff | 296/97.8 |
| 5,306,065 | 4/1994 | Ades | 296/97.6 |

FOREIGN PATENT DOCUMENTS 1138842 6/1957 France.
2300938 7/1974 Germany.

Primary Examiner—David M. Mitchell
Assistant Examiner—Kia M. Robinson
Attorney, Agent, or Firm—Poms, Smith, Lande & Rose

[57] ABSTRACT

A sun visor attachment adapted to be secured to a preexisting sun visor is disclosed. A main body portion of the attachment having laterally and vertically extendable panels is secured to the preexisting sun visor. A wing body portion is connected by a multi-axis pivot to the main body portion and is swung away from a closed position adjacent the main portion to an open position, including discrete rotations from the vertical. The wing body portion also has vertically and laterally extendable panels and, in addition, has a support assembly for maintaining the wing body portion in its open position.

4 Claims, 5 Drawing Sheets

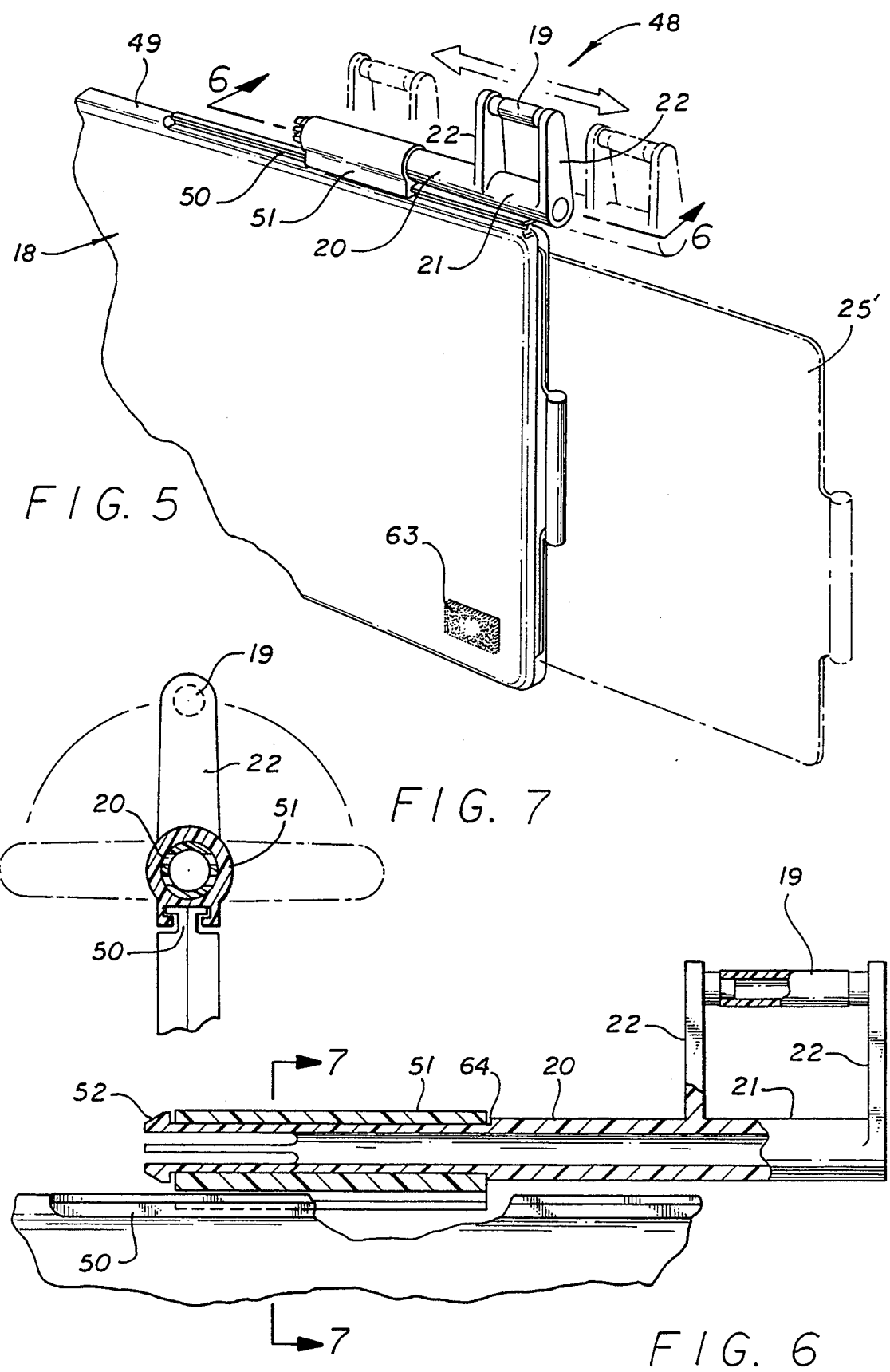

PIVOTABLE SUN VISOR ATTACHMENT

BACKGROUND OF THE INVENTION

1. Field of the Invention

The present invention generally relates to sun visor attachments, and more particularly, to a double body sun visor attachment with extendable panels that is adapted to be secured to a preexisting visor in a vehicle.

2. Description of the Prior Art

Devices for shielding the eyes of automobile drivers and their passengers from the rays of the sun have been known almost from the first days of the automobile. Early shield devices were in the form of visors, simple opaque rectangles that eventually became the types of standard sun visors that are permanently mounted in modern vehicles.

A typical standard sun visor is pivotable about a horizontal rod anchored at one corner of a vehicle ceiling, the rod itself capable of being swung about its anchoring point from a front windshield position to a side window position.

Much of the prior art has been devoted to replacing such a fixedly mounted visor with an improved sun visor configuration for providing increased sun blocking protection. Three examples of replacement type sun visors will illustrate this broad area of the prior art.

The first, U.S. Pat. No. 4,810,023 (Kawada) discloses a single body having vertically and laterally slidable panel members and requiring a preexisting rod for mounting.

Secondly, U.S. Pat. No. 4,858,982 (Dykstra et al.) teaches a series of nested panels and a separate means for mounting which includes a pair of pivot axles, necessitating not only replacement of the standard visor and of its mounting hardware but also the addition of a second pivot rod.

The third example of replacement visors, U.S. Pat. No. 5,156,434 (Vandagriff) generally discloses a single body with movable vertical and lateral panels and a third panel capable of being swung away from the main body and also rotatable in a clockwise and counterclockwise direction, all requiring installation of its own mounting hardware.

The other broad category of prior sun visor art relates to those improved devices which do not require replacement of the existing visor or mounting fixtures. U.S. Pat. No. 4,950,021 (Vandagriff), for example, teaches a rear mounting section for removably attaching to an existing standard visor and extendable panel section or sections that can be swung away from the rear mounting section. No replacement of either the preexisting visor or its ceiling mount is required.

While the prior art attempts to cover the windshield and side window areas that are not blocked by traditional sun visors, no visor is known which both quickly and easily attaches to a preexisting visor and provides more than one body with multiple extending panels.

SUMMARY OF THE INVENTION

It is an object of this invention to provide a vehicle sun shield apparatus which can be adjusted longitudinally and vertically to provide increased lateral and below-visor sun blockage, in a closed position.

It is a further object of this invention to provide such an adjustable sun shielding apparatus which can be also swung out to an open position to provide increased front and side sun blockage simultaneously.

It is another object of this invention to provide such an adjustable and openable sun shielding apparatus which can be attached to a preexisting sun visor of a vehicle.

It is yet another object of this invention to provide such a sun visor attachment which can be fixed in a variety of spaced, angular positions.

These and other objects are accomplished in one exemplary embodiment by providing an adjustable sun visor attachment which has a main body portion that can be attached removably to a preexisting sun visor, and a wing body portion which is coupled to the main body portion by multi-axis pivoting means so that the wing body portion is capable of being swung away from the main body portion, resulting in increased blockage of the sun's rays.

Both main and wing body parts have panels sandwiched within their respective body walls, one set of which panels is capable of being extended in a lateral direction, with the other set of panels extendable in a vertical direction.

The pivoting means allows the wing body portion to be not only swung away from the main body portion but to be pivoted in discrete steps from an initially generally vertical position to a variety of discrete positions between the vertical and the horizontal, for enhanced versatility in placing the wing body portion for maximum sun shielding effectiveness, including positioning the lateral panel of the wing body portion behind the rear view mirror in some vehicles.

In another embodiment, a mirror image version of the invention is employed on the passenger side of the vehicle in the same manner as the previously summarized exemplary embodiment.

To aid in the explanation of the exemplary embodiment, reference will be made to the appended sheets of drawings which will first be described briefly.

BRIEF DESCRIPTION OF THE DRAWINGS

FIG. 5 is a partial perspective view of the wing body portion of FIG. 2, showing the slider shaft assembly;

FIG. 6 is a section view taken along line 6—6 of the slider shaft assembly of FIG. 5;

FIG. 7 is a section view taken along line 7—7 of the assembly of FIG. 6;

DETAILED DESCRIPTION OF AN EXEMPLARY EMBODIMENT

Figure 1:
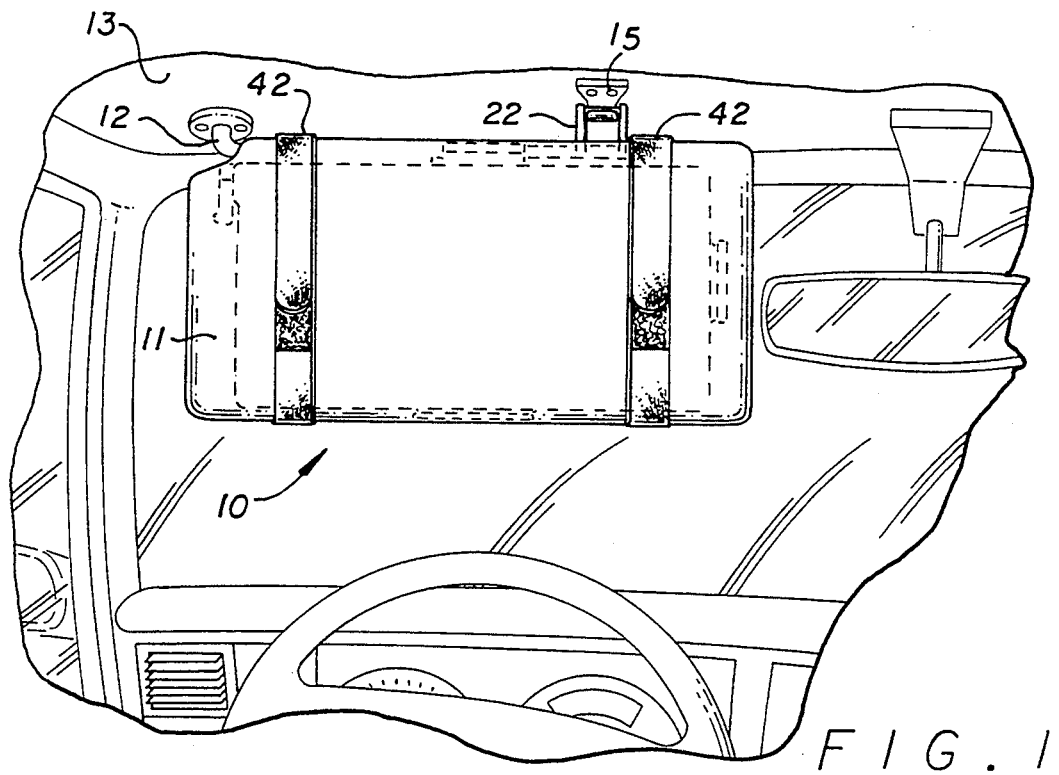
FIG. 1 is a front elevation view of a sun visor attachment in accordance with the invention, shown in ghost lines and attached in the closed position to a preexisting sun visor on the driver's side of a vehicle.

Referring now to FIG. 1 of the drawing, a sun visor attachment 10 is shown secured to the conventional sun visor 11 of a vehicle. Visor 11 turns about an L-shaped rod 12 extending from the ceiling 13 of the vehicle, as is well-known in the art. The opposite end of rod 12 normally snaps releasably into a U-shaped bracket 15 fixed to the ceiling 13 of the vehicle, as is also well-known in the art. Sun visor attachment 10 is shown (ghost lines) in its closed or folded position, where it can be seen that the overall length and height of attachment 10 before unfolding is generally related to the overall length and height of visor 11.

Figure 2:
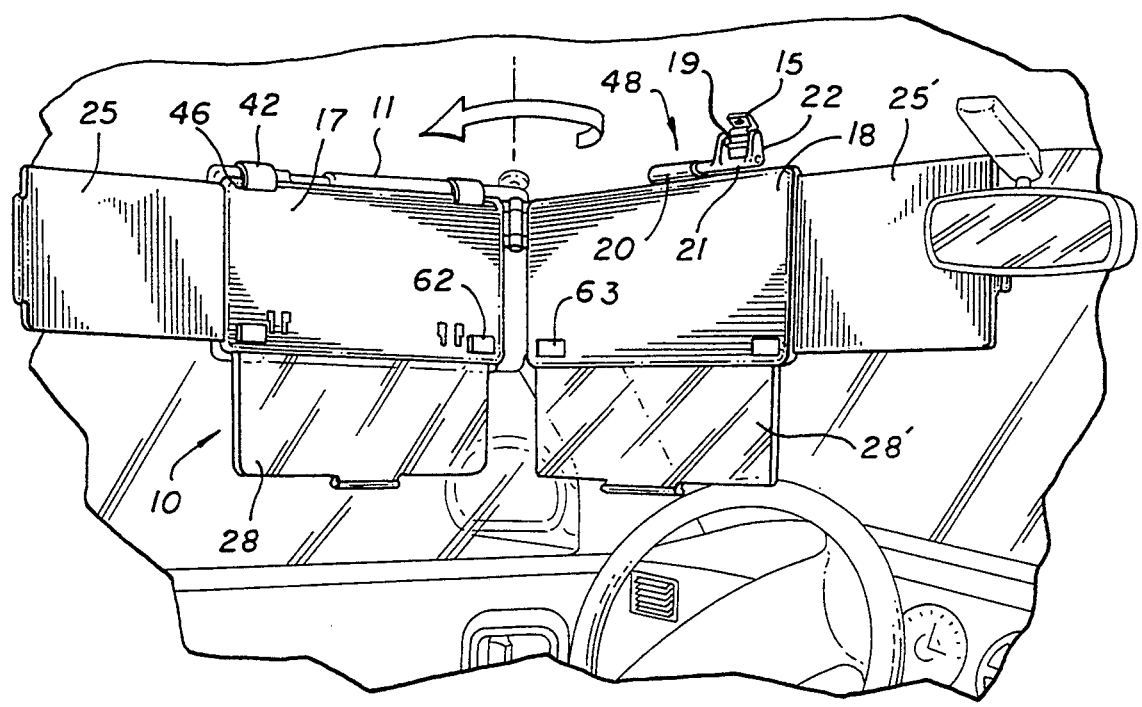
FIG. 2 is a front elevation view of the attachment of FIG. 1 in an open position, showing the main body portion and the wing body portion of the attachment.

FIG. 2 illustrates an unfolded or open position of adjustable visor attachment 10 showing main body portion 17 attached to driver side visor 11, and wing body portion 18 swung away from main body portion 17. In this open position, cooperating fastening means for attaching main body portion 17 to wing body portion 18 in the closed position are exposed to view, including hook fastening patches 62 mounted on the lower corners of main body portion 17, and loop fastening patches 63 mounted on corresponding corners of wing body portion 18. Roller pin 19 of slider shaft 20 (see FIG. 5 for detail) is seen engaging bracket 15 to provide support to wing body portion 18. In some vehicles, neck 21 of shaft 20 may engage bracket 15 to provide additional stability, with struts 22 swung beneath and behind bracket 15 so that roller pin 19 rests on the windshield side of bracket 15, i.e., on the side of bracket 15 away from the driver of the vehicle.

Figure 3:
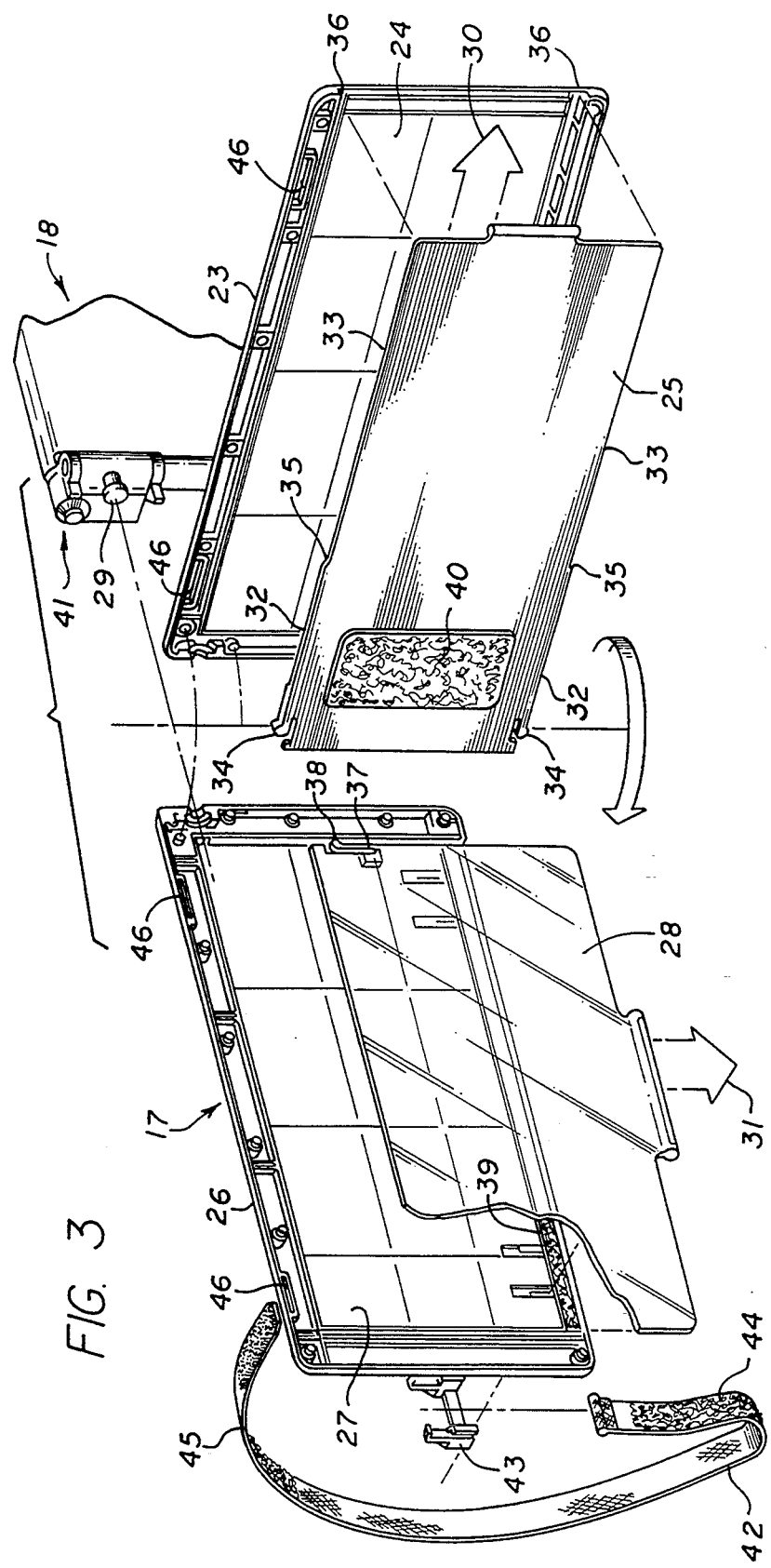
FIG. 3 is an exploded view of a main body portion of the attachment of FIGS. 1 and 2.

As seen in FIG. 3, first main panel 25, preferably an opaque panel, is laterally movable in the direction of arrow 30 from a base position completely within first main body cavity 24 of first main body wall 23 to a variety of positions exposing panel 25. A ridge 32 is formed along a portion of each bearing edge 33 of first main panel 25, extending from a friction boss 34 to an edge lip 35, which engages a peripheral segment of first wall 23 at 36 to prevent panel 25 from extending further out of cavity 24.

Similarly, second main panel 28, preferably a tinted translucent panel, is downwardly movable in the direction of arrow 31 from a base position completely within second main cavity 27 of second main body wall 26 to a variety of positions exposing panel 28. A stop 37 is formed on the side of panel 28 adjacent second wall 26 in the vicinity of a friction boss 38 formed in panel 28, and engages a wall ridge 39 in wall 26 to prevent panel 28 from extending further out of cavity 27.

Figure 4:
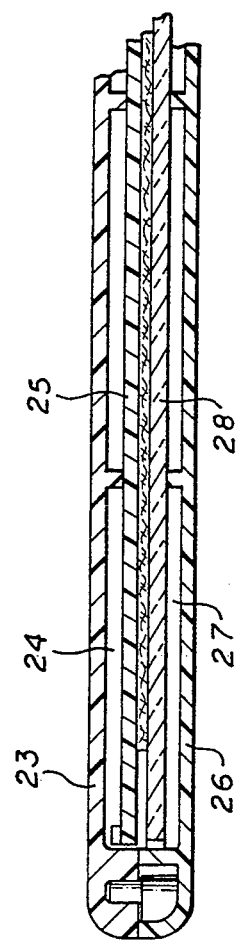
FIG. 4 is a partial section plan view of the assembled main body portion of FIG. 3.

A protective pad 40, preferably a soft felt-like material, forms a buffer between panels 25 and 28. The relationship of the main body 17 components as assembled is illustrated in the plan section view of FIG. 4.

When main panel walls 23, 26 are joined together, panels 25 and 28 are sandwiched therewithin, as well as projecting rotator boss 29 of pivoting means 41 (FIG. 3). Main body portion securing straps 42 are fastened to the rear side of the second main body portion wall 26 by a pair of strap clamps 43, one of which is shown in FIG. 3. A portion of the side of strap 42 adjacent strap clamp 43 and facing away from main body portion wall 26, is covered with a loop fabric 43, with the remainder of that side of strap 42 covered in a pattern of hooks 45, as is well known in the art. Hook-and-loop straps 42 are passed through strap holes 46 in both main body portion walls for securing visor attachment 10 to a preexisting sun visor as will be described later.

Figure 9:
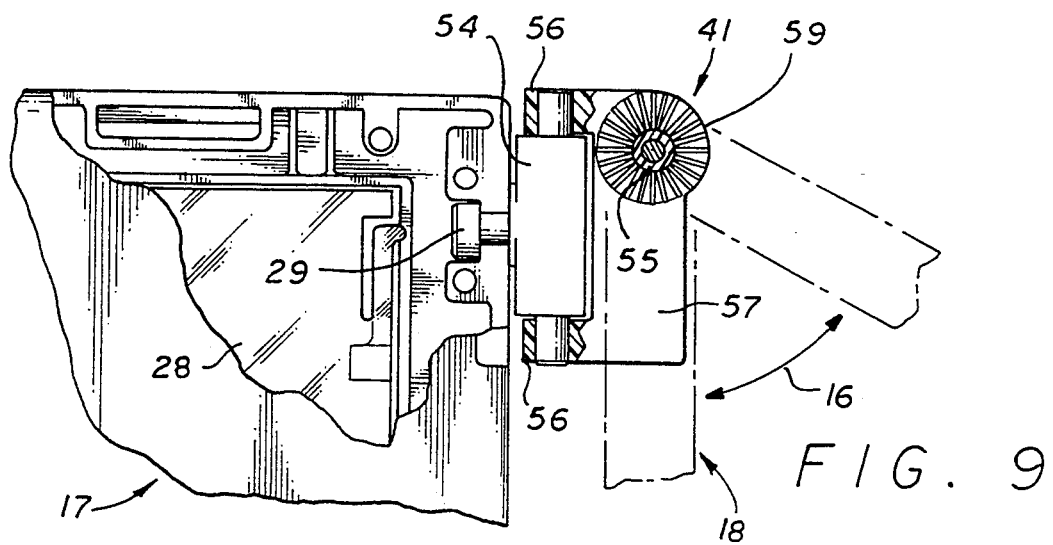
FIG. 9 is a partial section view taken along lines 9—9 of FIG. 8.
Figure 10:
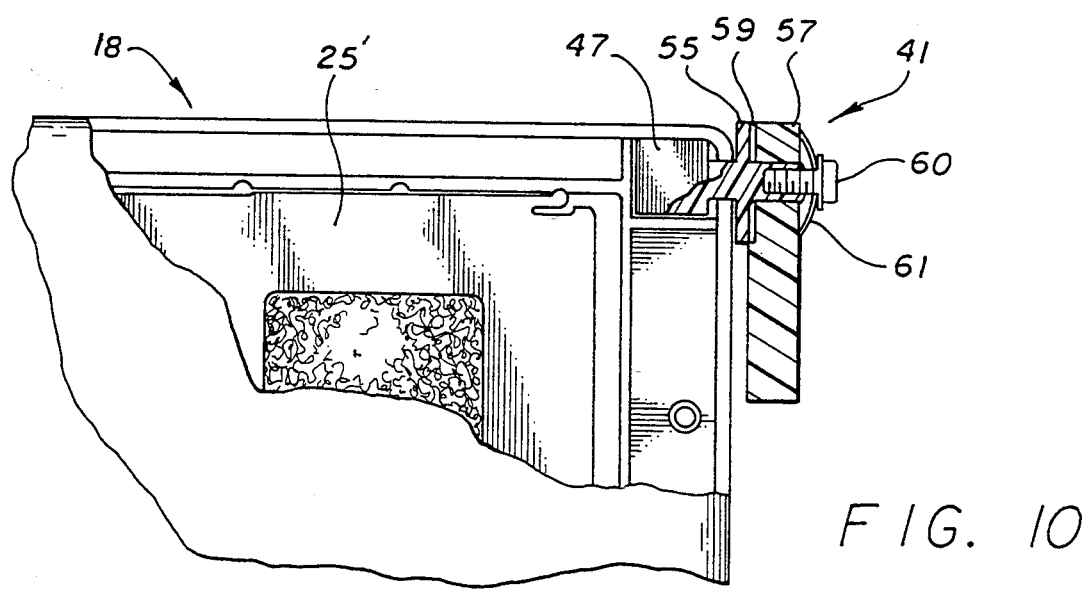
FIG. 10 is a partial section view taken along lines 10—10 of FIG. 8.

Wing body portion 18, shown partially in FIG. 3, is similar in basic construction to that of main body portion 17, except, of course, that the components are assembled in mirror image to that of main body portion 17. Additionally, there are no securing straps or provisions therefor on wing body portion 18, and pivoting means 41 connects to main body portion 17 as shown in FIG. 9, whereas wing body portion 18 accepts anchoring boss 47 of pivoting means 41 as shown in FIG. 10. Wing body portion 18 also includes a supporting slider shaft assembly 48, as illustrated in FIGS. 5-7.

Components of wing body portion 18 that correspond to main body portion 17 components are referenced by the same numerals employed to designate like components in FIG. 3, with wing body portion components distinguished by the use of a prime mark with each numeral. For example, laterally movable first panel of main body portion 17 has a reference numeral 25, and the corresponding laterally movable first panel of wing body portion 18 has a reference numeral 25' as shown in FIGS. 1 and 5.

Slider shaft assembly 48 is slidably mounted to the horizontal edge 49 of wing body portion 18 opposite pivoting means 41, as illustrated in FIG. 3, showing slider race 50 disposed along approximately one half of horizontal edge 49.

Referring to FIG. 6, carriage 51 receives slider shaft 20 to the depth of shaft stop 64, whereupon shaft spring members 52 expand to hold shaft 20 rotatably in place within carriage 51. Shaft 20 may rotate through approximately 180° as shown in FIG. 7, so that slider shaft assembly 48 can be extended and rotated as necessary to accommodate any open position of wing body portion 18 enabling roller pin 19 to be held in place by U-shaped bracket 15 (FIG. 1).

Figure 8:
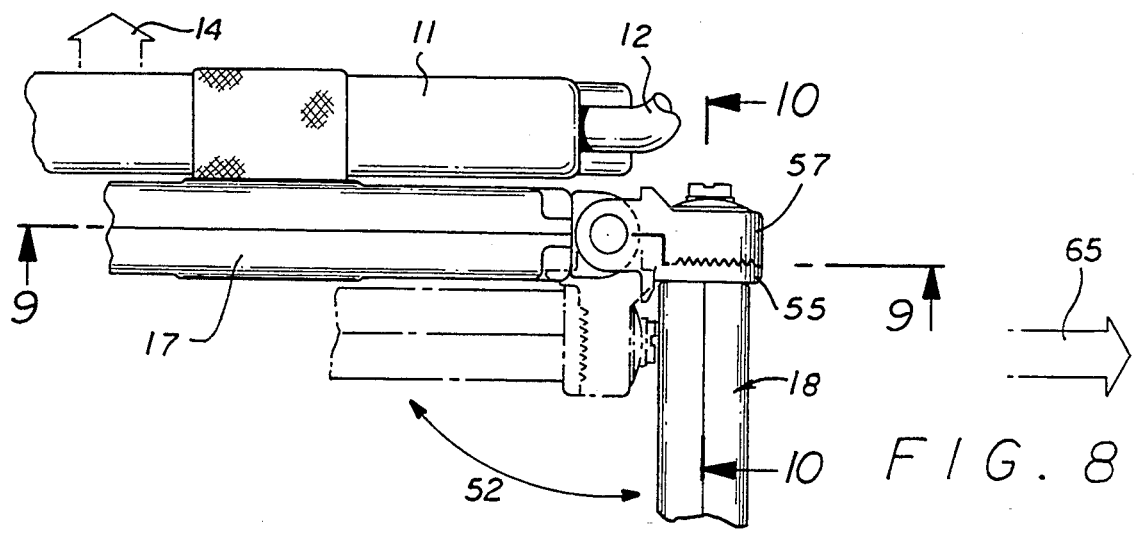
FIG. 8 is a plan view of the attachment of FIG. 1 showing pivoting means.

The construction of one exemplary pivoting means 41 is more clearly shown in FIGS. 8-10,. Main body portion 17 is stably secured to preexisting visor 11 and wing body portion 18 is shown in FIG. 8 having been swung away from its closed position to an .open position, generally perpendicular to main body portion 17 as indicated by arrow 52. Rotator boss 29 of hinge pin 54 is shown in FIG. 9 captured within main body portion 17 and hinge pin 54 is received within supports 56 of pivot block 57.

In addition to swinging about hinge pin 54, wing body portion 18 also can be rotated about discrete rotator member 55 as illustrated in FIG. 9, which represents a section view in the open position of wing body portion 18. Wing body portion 18 pivots about discrete rotator member 55 from the vertical plane generally perpendicular to main body portion 17, toward the driver of the vehicle to a horizontal plane in discrete steps as determined by the mating of pivot block toothed engaging surface 59 with the toothed engaging surface of discrete rotator member 55. The travel of Wing body portion 18 about rotator member 55 in the opposite direction shown by pivot arrow 16 (away from the driver) is limited by contact with the windshield of the vehicle.

The discrete rotator apparatus can be seen in more detail by referring to FIG. 10. Discrete rotator member 55 is held securely within wing body portion 18 by anchoring boss 47 and extends through pivot block 57, where it is held in place by adjusting screw 60 bearing against bias spring 61. The force with which pivot block toothed engaging surface 59 mates with the toothed engaging surface of discrete rotator member 55 is controlled by the position of adjusting screw 60.

Figure 11:
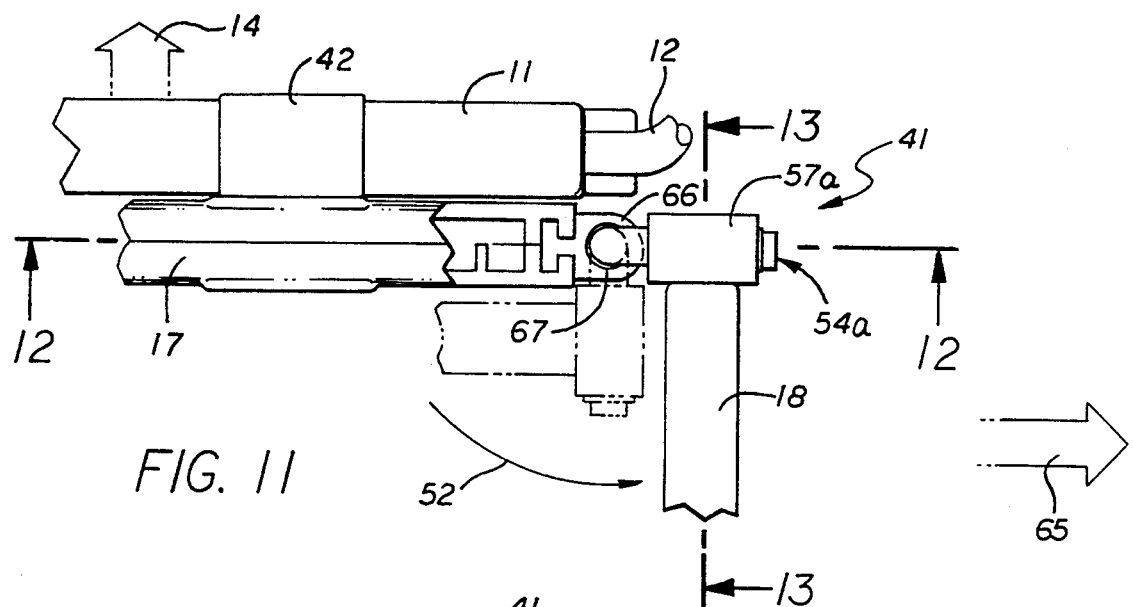
FIG. 11 is a plan view of the attachment of FIG. 1 showing alternate pivoting means.
Figure 12:
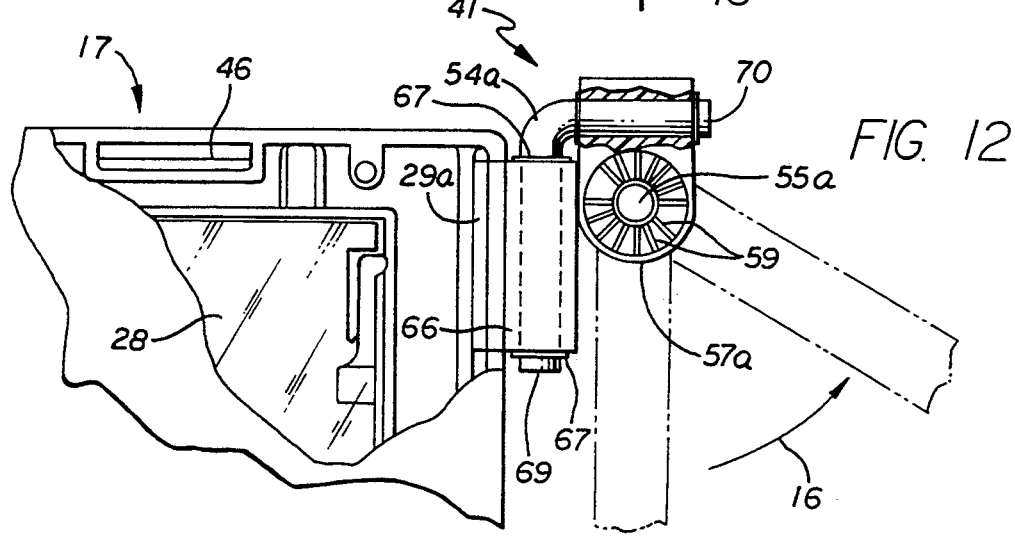
FIG. 12 is a partial section view taken along lines 12—12 of FIG. 11.
Figure 13:
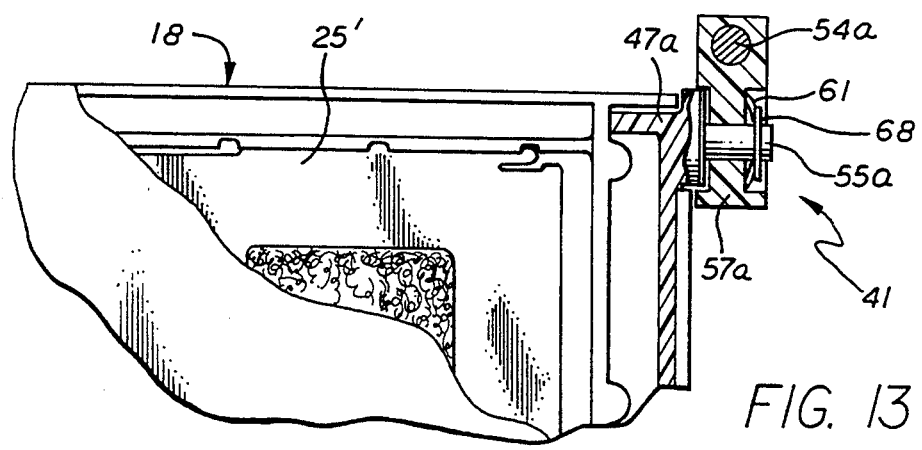
FIG. 13 is a partial section view taken along lines 13—13 of FIG. 11.

Another exemplary pivoting means 41 is shown in FIGS. 11–13. Wing body portion 18 is shown in FIG. 11 in its open position swung away from and generally perpendicular to main body portion 17. In FIG. 12 it can be seen that the vertical leg 69 of right angle hinge pin 54a is inserted to turn freely within hinge pin receiver 66 and restrained from vertical movement by retaining washers 67. Receiver anchoring member 29a projects from hinge pin receiver 66 and is held securely within main body portion 17. Horizontal leg 70 of right angle hinge pin 54a is similarly fit into pivot block 57a to complete the horizontal swinging mechanism of pivoting means 41.

In addition to swinging away from main body portion 17, wing body portion 18 is also capable of pivoting towards the driver of the vehicle to a horizontal plane as described previously. FIG. 12 illustrates the pivoting of wing body portion 18 in discrete steps as determined by the mating of pivot block toothed engaging surface 59 with the toothed engaging surface of discrete rotator member 55a. The extent of forward travel of wing body portion 18 in the direction away from the vehicle driver (arrow 16) depends on the location of the vehicle windshield.

The mounting of pivoting means 41 to wing body portion 18 can be seen in FIG. 13. Discrete rotator member 55a is held securely within wing body portion 18 by pivot block anchor 47a and extends through pivot block 57a where it is held in place by keeper washer 68 bearing against bias spring 61.

In operation, visor attachment 10 is secured to the back (windshield side) of preexisting visor 11 of a vehicle via securing straps 42 which are passed around visor 11, through strap holes 46, and then back against themselves to complete a conventional hook-and-loop connection, as illustrated in FIG. 1. In the closed position of attachment 10, hook-and-loop fastening patches 62, 63 (shown separated in FIG. 2) cooperate to hold main body portion 17 against wing body portion 18. Although attachment 10 is shown in FIG. 1 as secured to the driver's visor, it will be readily seen that a mirror image of attachment 10 can be employed on the passenger side as well.

When preexisting visor 11 is in its vertical position in front of the driver, any of the extendable panels 25, 28, 25', 28' may be deployed from either of the body portions 17, 18 in the closed position of attachment 10 to increase sun blockage areas below and to the right side of the driver's sun visor 11. For maximum benefit from this embodiment of the invention, the driver's visor 11 with attachment 10 is positioned along the driver's side window by moving L-shaped rod 12 in the conventional manner for switching the sun visor from a windshield position to a side window position. Wing body portion 18 is then swung away from main body portion 17 and supported via slider shaft assembly 48 from U-shaped bracket 15, as illustrated in FIG. 2. The driver's side window is in the direction indicated by side arrow 14, while the front of the vehicle is in the direction indicated by front arrow 65. Slider shaft assembly 48 can be slid along slider race 50 and shaft 20 rotated as necessary to accommodate a wide variety of vehicle visor mounting configurations.

Once wing body portion 18 is swung away from main body portion 17, wing 18 may be pivoted, as discussed above, to a number of discrete positions as shown in FIG. 9. These positions range from the generally horizontal location where wing body portion 18 is fully removed from obstructing the driver's view, to an extreme forward location against the vehicle windshield (not shown).

From any of the possible positions, extendable panels 25, 25', 28 28' are movable to provide for the sun shielding needs of the driver. Additionally, the flexibility provided by the construction of pivoting means 41 allows lateral panel 25' to be positioned behind the rear view mirror in many vehicles. The operation of a mirror image embodiment for a passenger side visor attachment is virtually identical to that for the driver's side just described.

There is thus described a widely adjustable sun visor attachment which can be quickly secured into position on a preexisting visor, then easily adjusted for increased front and side window sun blockage by a driver while operating a vehicle.

Although, in accordance with the present invention, a sun visor attachment has been described for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A sun visor attachment adapted to be secured to a preexisting sun visor of a vehicle, said sun visor attachment (10) comprising:

a main body portion (17) having attachment means for removably securing said main body portion (17) to said preexisting sun visor, and having a plurality of generally planar extendable panels (25, 28) sandwiched therewithin and movable with respect to one another;

multi-axis pivoting means (41) mounted to said main body portion (17) at a corner thereof; and a wing body portion (18) connected to said main body portion (17) by said pivoting means (41) to allow said wing body portion (18) to be swung from a closed position adjacent said main body portion (17) to an open position away from said main body portion (17), said wing body portion (18) having support means for stably maintaining said wing body portion (18) in said open position, and having a plurality of generally planar extendable panels (25', 28') sandwiched therewithin and movable with respect to one another, said pivoting means (41) comprising:

a pivot block (57a) having a radially toothed engaging surface (59) formed in a lower end of a vertical surface thereof;

a discrete rotator member (55a) having a pivot block anchor (47a) and a rotator toothed surface movably mating with said pivot block radially toothed engaging surface (59); and a right angle hinge pin (54a) having a vertical leg (69) disposed longitudinally adjacent said main body portion (17) and turnably held within a hinge pin receiver anchoring member (29a) projecting therefrom, said anchoring member (29a) fixedly mounted within said main body portion (17) and said right angle hinge pin (54a) having a horizontal leg (70) turnably held within said pivot block (57).

2. The sun visor attachment (10) of claim 1 wherein said main body portion (17) further comprises:

a first main body portion wall (23) having a first main wall cavity (24) therein receiving a first panel (25) therein, said first panel (25) being movable from a base position disposed within said first main wall cavity (24) to a plurality of exposed positions extending laterally out of said first main wall cavity (24); and a second main body portion wall (26) having a second main wall cavity (27) therein receiving a second panel (28) therein, said second panel (28) being movable in a direction downwardly and linearly away from said second main wall cavity (27) from a base position disposed within said second main wall cavity (27) to a plurality of exposed positions extending out of said second main wall cavity (27), said second main body portion wall (26) secured to said first main body portion wall (23) thereby sandwiching said first and second panels (25, 28) and said hinge pin receiver anchoring member (29a) therebetween.

3. The sun visor attachment (10) of claim 1 wherein said wing body portion (18) further comprises:

a first wing body portion wall (23') having a first wing wall cavity (24') therein receiving a first panel (25') therein, said first panel (25') being movable from a base position disposed within said first wing wall cavity (24') to a plurality of exposed positions extending laterally out of said first wing wall cavity (24'); and a second wing body portion wall (26') having a second wing wall cavity (27') therein receiving a second panel (28') therein, said second panel (28') being movable in a direction downwardly and linearly away from said second wing wall cavity (27') from a base position disposed within said second wing wall cavity (27') to a plurality of exposed positions extending out of said second cavity (27'), said second wing body portion wall (26') secured to said first wing body portion wall (23') thereby sandwiching said first and second panels (25', 28') and said pivot block anchor (47a) therebetween.

4. A sun visor attachment adapted to be secured to a preexisting sun visor of a vehicle, said sun visor attachment (10) comprising:

a main body portion (17) having attachment means for removably securing said main body portion (17) to said preexisting sun visor, and having a plurality of generally planar extendable panels (25, 28) sandwiched therewithin and movable with respect to one another;

multi-axis pivoting means (41) mounted to said main body portion (17) at a corner thereof; and a wing body portion (18) connected to said main body portion (17) by said pivoting means (41) to allow said wing body portion (18) to be swung from a closed position adjacent said main body portion (17) to an open position away from said main body portion (17), said wing body portion (18) having support means for stably maintaining said wing body portion (18) in said open position, and having a plurality of generally planar extendable panels (25', 28') sandwiched therewithin and movable with respect to one another, said wing body portion support means further comprising:

a slider race (50) disposed along a horizontal edge (49) of said wing body portion (18) opposite said pivoting means (41); and a slide shaft assembly (48) including a carriage (51) slidably mounted on said slider race (50), said carriage (51) rotatably receiving a slider shaft (20) therein having parallel struts (22) perpendicular to said shaft, defining a shaft neck (21) therebetween, said struts (22) supporting a roller pin (19) between extreme ends thereof.

* * * * *